(12) United States Patent
Maitlen et al.

(10) Patent No.: US 10,540,824 B1
(45) Date of Patent: Jan. 21, 2020

(54) 3-D TRANSITIONS

(71) Applicant: Microsoft Technology Licensing, LLC, Redmond, WA (US)

(72) Inventors: Craig R. Maitlen, Redmond, WA (US); John Edward Churchill, Monroe, WA (US); Joseph Wheeler, Redmond, WA (US); Tyler P. Esselstrom, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/030,776

(22) Filed: Jul. 9, 2018

(51) Int. Cl.
*G06T 19/20* (2011.01)
*G06T 15/00* (2011.01)

(52) U.S. Cl.
CPC ............ *G06T 19/20* (2013.01); *G06T 15/005* (2013.01); *G06T 2200/04* (2013.01)

(58) Field of Classification Search
None
See application file for complete search history.

(56) References Cited

U.S. PATENT DOCUMENTS

| | | | |
|---|---|---|---|
| 5,850,352 A | 12/1998 | Moezzi et al. | |
| 7,019,748 B2 | 3/2006 | Raskar | |
| 7,453,459 B2 * | 11/2008 | Shekter | G06T 15/005 345/423 |
| 7,589,732 B2 | 9/2009 | Burtnyk et al. | |
| 8,049,750 B2 | 11/2011 | Gloudemans et al. | |
| 9,286,730 B2 | 3/2016 | Bar-Zeev et al. | |
| 9,690,374 B2 | 6/2017 | Clement et al. | |
| 2003/0090485 A1 * | 5/2003 | Snuffer | G06T 15/405 345/422 |
| 2003/0227453 A1 | 12/2003 | Beier et al. | |
| 2009/0128549 A1 | 5/2009 | Gloudemans et al. | |
| 2010/0299630 A1 | 11/2010 | Mccutchen et al. | |
| 2014/0129130 A1 | 5/2014 | Kuramura et al. | |
| 2014/0267343 A1 | 9/2014 | Arcas et al. | |
| 2014/0361976 A1 | 12/2014 | Osman et al. | |

(Continued)

FOREIGN PATENT DOCUMENTS

CN 102724418 B 6/2016

OTHER PUBLICATIONS

"Movement in VR", Retrieved from Internet: https://unity3d.com/learn/tutorials/topics/virtual-reality/movement-vr, Dec. 10, 2015, 6 Pages.

(Continued)

*Primary Examiner* — Said Broome
(74) *Attorney, Agent, or Firm* — Newport IP, LLC; Jacob P. Rohwer; Han Gim

(57) ABSTRACT

Techniques for managing transitions in a three-dimensional environment include rendering, on the displays, a first three-dimensional scene. An indication is received that the first three-dimensional scene is to be replaced with a second three-dimensional scene. Graphics data is received that is representative of a transition to the second three-dimensional scene. The first three-dimensional scene is transitioned to the second three-dimensional scene using the graphics data. Control of rendering the second three-dimensional scene is transitioned to a process configured to render the second three-dimensional scene.

19 Claims, 8 Drawing Sheets

(56) References Cited

U.S. PATENT DOCUMENTS

| | | |
|---|---|---|
| 2014/0364212 A1 | 12/2014 | Osman et al. |
| 2015/0302651 A1 | 10/2015 | Shpigelman |
| 2016/0171771 A1 | 6/2016 | Pedrotti et al. |
| 2016/0314624 A1 | 10/2016 | Li et al. |

OTHER PUBLICATIONS

"New! SkyBox 360/VR Transitions 2 | Premiere Pro", Retrieved from: https://www.mettle.com/new-skybox-360vr-transitions-2-premiere-pro/, Jan. 19, 2017, 5 Pages.

Billinghurst, et al., "The MagicBook: A Transitional AR Interface", In Journal of Computers & Graphics, vol. 25, Issue 5, Oct. 2001, 14 Pages.

Chyr, William, "Six Directions of World Wrapping", Retrieved from: http://williamchyr.com/tag/geometry/, Apr. 27, 2014, 16 Pages.

Levitt, David, "Pantomime Corporation Launches Immersive 3D Pantomime Playground™ No Virtual Reality Headset Needed", Retrieved from: http://www.prweb.com/releases/pantomime_playground/app_launch/orweb12935469.htm, Sep. 1, 2015, 7 Pages.

Steele, Michael, "Welcome to the SkyBox: Quadro GPUs Help Video Editors Transition to 360 VR Content", Retrieved from: https://blogs.nvidia.com/blog/2016/04/18/mettle-skybox-quadro-nab/, Apr. 18, 2016, 2 Pages.

Steinicke, Frank, "Natural Locomotion Interfaces—With a Little Bit of Magic!", In SBC Journal on 3D Interactive Systems, vol. 2, Issue 2, Aug. 23, 2016, pp. 86-89.

"International Search Report and Written Opinion Issued in PCT Patent Application No. PCT/US2019/037848", dated Aug. 19, 2019, 12 Pages.

"Prime Games Bulgaria—Independent Game Studio—HOWTO: Create a loading screen with a loading bar in Unity", Retrieved From: https://www.primegames.bg/en/blog/howto-create-a-loading-screen-with-a-loading-bar-in-unity, Sep. 13, 2017, 3 Pages.

\* cited by examiner

3-D TRANSITIONS

BACKGROUND

As use of 3-D rendering systems such as head-mounted display devices becomes more prevalent, an increasing number of users can participate in an experience in which content is displayed via augmented reality (AR) techniques, mixed reality techniques, and/or virtual reality (VR) techniques. In addition to entertainment scenarios, more and more people are implementing these experiences for a particular purpose (e.g., an employee training experience for new employee training, a marketing experience for potential purchasers of a service such as a vacation or an item such as a pair of skis, etc.). Scenes displayed in AR, VR, etc. can often have rapid transitions in what is displayed under various circumstances.

It is with respect to these and other technical challenges that the disclosure made herein is presented.

SUMMARY

Transitions between scenes and applications in a three-dimensional environment can sometimes be disorienting and/or unpleasant due to the sudden transitions or during the time period in between scenes which may be darkened or blank. For example, in some cases the transition can be a jarring cut or a fade through black. In three-dimensional environments such as immersive virtual reality systems, a splash screen that is typically used during transitions in 2D environments is not an adequate solution as it does not cover the user's full field of view. The techniques described herein provide a platform that uses a three-dimensional splash screen and transitional techniques to create a smooth transition between scenes and applications in a three-dimensional environment. In one embodiment, the platform may render splash screen pixels to a three-dimensional display until the new application is ready to start rendering. Once the new application is ready, the new application may assume control of rendering the three-dimensional display. By managing scene transitions in this manner, a smooth transition may be rendered between scenes and applications while avoiding jarring cuts or the need to fade through black.

Various embodiments are disclosed that are directed to techniques for generating a transition between display images in a three-dimensional environment that reduces the degree of abruptness in changes between displayed images to provide a smoother experience for user viewing. The techniques may be applicable to the realm of three-dimensional displays (such as virtual and augmented reality displays) in which abrupt changes to what is displayed on a virtual reality headset can create an uncomfortable experience for the user. In one embodiment, a panoramic wide range 3D image is rendered. When transitioning to the images for a different experience, some aspects of the initial panoramic wide range 3D image fades out and the images for the new experience (e.g., for a gaming experience) may have their associated pixels faded into the displayed images of the panoramic wide range 3D image. This may allow for an image transition that does not include blanking out any part or all of the display in transitioning between the scenes for the two different experiences.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. The same reference numbers in different figures indicate similar or identical elements.

DETAILED DESCRIPTION

Figure 1:
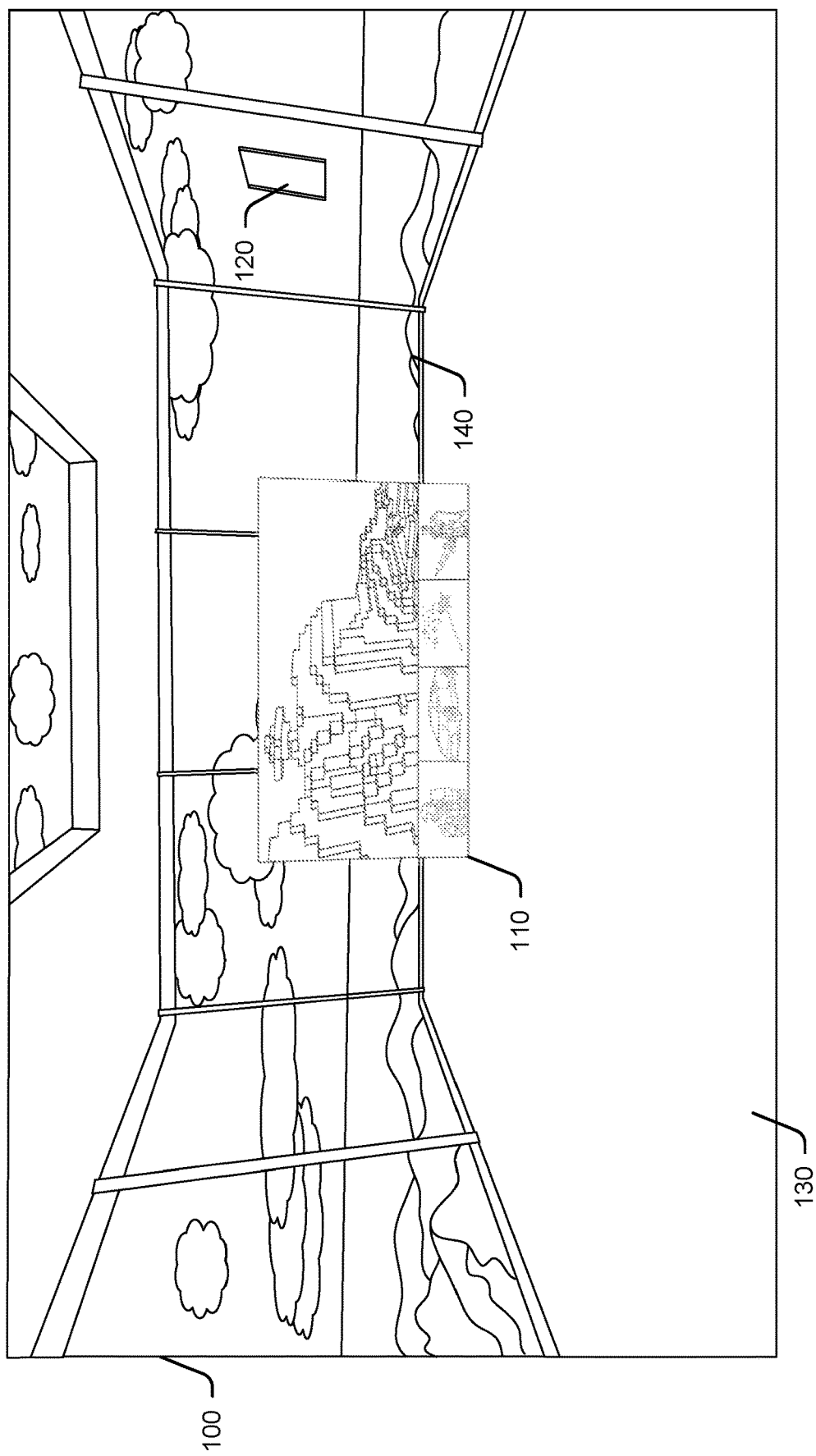
FIG. 1 is a diagram illustrating an example of a screen in a 3D environment according to some embodiments.

Many systems are capable of rendering 3-D environments, such as virtual reality (VR) systems and augmented reality (AR) systems. An example of a VR system may be a head mounted display device (HMD) or similar device worn by a user to generate an immersive VR environment. Typically, an HMD is a portable device worn on the head of the user. A display is located a short distance from the eyes and provides images for user viewing and interaction. Some HMDs provide mixed VR and AR environments, where the user is able to see images created by a computing device, as well as some real-live images. Other HMDs provide immersive experiences that block the outside world to the user, while providing a virtual world on the HMD display.

The physical movement of the user may be translated into corresponding movements in the 3D environment. Differences in the boundaries of what is rendered by one application, and the boundaries rendered by another application may cause discrepancies or disruptions in the immersive experience and disorientation as the user approaches and/or encounters a transition between applications. For example, when transitioning between applications, the immersive VR environment may be blacked out, or rendered in an abrupt transition that may be jarring or disorienting. A smooth, or graceful, transition, for example, from the virtual world of one application or scene to the virtual world of another application or scene real may avoid the disorientation, motion sickness, or other effects which may occur as a user experiences the abrupt transitions.

The disclosed embodiments describe methods, apparatus, systems, and computer programs for managing the display of images in a 3D rendering environment such as a virtual reality platform, for example where a head mounted device (HMD) or other VR display is utilized. While many examples are described herein in the context of HMDs configured to render 3D VR environments, it should be understood that the disclosed techniques may be implemented in any environment where scenes are transitioned in a 3D environment. It will be apparent, that the present embodiments may be practiced without some or all of these specific details. In other instances, well known process operations have not been described in detail in order not to unnecessarily obscure the present embodiments.

Various techniques are described for generating three-dimensional transitions, such as in a virtual reality (VR) environment. In various embodiments, a platform is provided that is configured to generate one or more transition or splash screens to facilitate transitions that address shortcomings described above. Additionally, the embodiments also overcome issues with simply applying transitions that are used in a two-dimensional environment when an application is being launched or transitioned. As used herein, the application or scene that is to be rendered may be referred to as the destination application or scene. The currently rendered application or scene may be referred to as the current application or scene.

In some embodiments, a platform may be configured to render splash screen pixels on the 3D display until the destination application is ready to start rendering or the destination scene is ready to be rendered. Once the application or scene is ready, the destination application assumes rendering of the splash screen pixels, allowing for a smooth transition between applications and games and avoiding jarring cuts or the need to fade through black.

The described techniques allow for a transition between display images that reduces the degree of abrupt change between displayed images to provide a smoother experience for users who are viewing a VR or other environment. The techniques may be suitable for VR displays in which abrupt changes to what is displayed on the VR display can create an uncomfortable experience for the user. In one embodiment, a panoramic wide range 3D image may be provided. During a transitioning sequence from the current application or scene to a destination application or scene, the current application or scene may be faded out or otherwise transitioned in a graduated manner. In one embodiment, the current application or scene can be a launch environment for the VR environment, which may be analogous to a start menu in a 2D system. The launch environment may include a panoramic wide range 3D image. When a transition is initiated to a destination application, the panoramic wide range 3D image may be faded out or otherwise transitioned in a graduated manner. The images for the destination application may have its associated pixels faded in or otherwise transitioned in a graduated manner to allow the new VR environment for the destination application to be rendered in a way that does not include blanking of the VR display, blacking out the VR display, or otherwise rendering an abrupt transition between the viewing experiences between the applications.

In one embodiment, a transition environment may include a rendered space such as that illustrated in FIG. 1. In the illustrated example, a launch environment 100 is depicted that includes a room with glass windows. Launch environment 100 further includes a selection menu 110 that enables selection of various applications and environments. While the present disclosure depicts example embodiments in the context of a rendered room environment, it should be understood that other rendered environments may be implemented while embodying the disclosed transition techniques.

In many VR environments, a blank or black environment is rendered during the time period when new applications are loaded or applications are transitioning. In the VR setting, the change to a blank or black environment may cause an unpleasant experience for users. For example, the user may be caused to feel claustrophobic when suddenly presented with a black environment as applications transition. Such undesirable transitions may also occur when transitioning between sessions or settings within the same application. The unpleasant transition may inhibit users from freely transitioning to new environments and applications, from multitasking between applications, or from freely using an application because the user wants to minimize the frequency of the unpleasant transitions. This can reduce the usefulness of applications as users may launch the applications less frequently or reduce their overall usage. Furthermore, some methods for rendering of transitions may utilize a large amount of system resources such as processing and storage resources. The described techniques address the described shortcomings, providing for a smooth and seamless transition between VR environments, while doing so in an efficient manner.

In many two-dimensional settings such as a two-dimensional gaming console, when a new application such as a game is launched, a splash screen is rendered to indicate to the user that the launch of the game has started. The splash screen serves to inform the user that processes are in place, while providing a visual holding pattern that allows for a smoother visual transition while the game is being loaded and launched.

In a VR environment, a splash screen is insufficient to provide a smooth transition because a three-dimensional environment must be rendered which is not amenable to a single splash screen across a 360-degree field of view. In the embodiment illustrated in FIG. 1, the outside of the rendered room is visible through windows. In one embodiment, the outside world may be an infinite cube represented through a number of windows or screens, which is shown as six windows in this example. When a game or other application is selected, the cube may be rendered on the windows to initiate the indications of transition. The rendering may occur in a graduated sequence so that the transition can occur in a sequenced fashion that provides a minimally perceptible transition. In some embodiments, a portal 120 may be rendered that renders a preview of the destination application or scene. For example, based on data pertaining to the destination application or destination scene, a representation of the destination application or destination scene may be generated or accessed and rendered in the portal, which may provide further indication to the user that the destination has been correctly selected. FIG. 1 also illustrates a foreground portion 130 and a background portion 140 that may be transitioned differently as further described herein.

Figure 2:
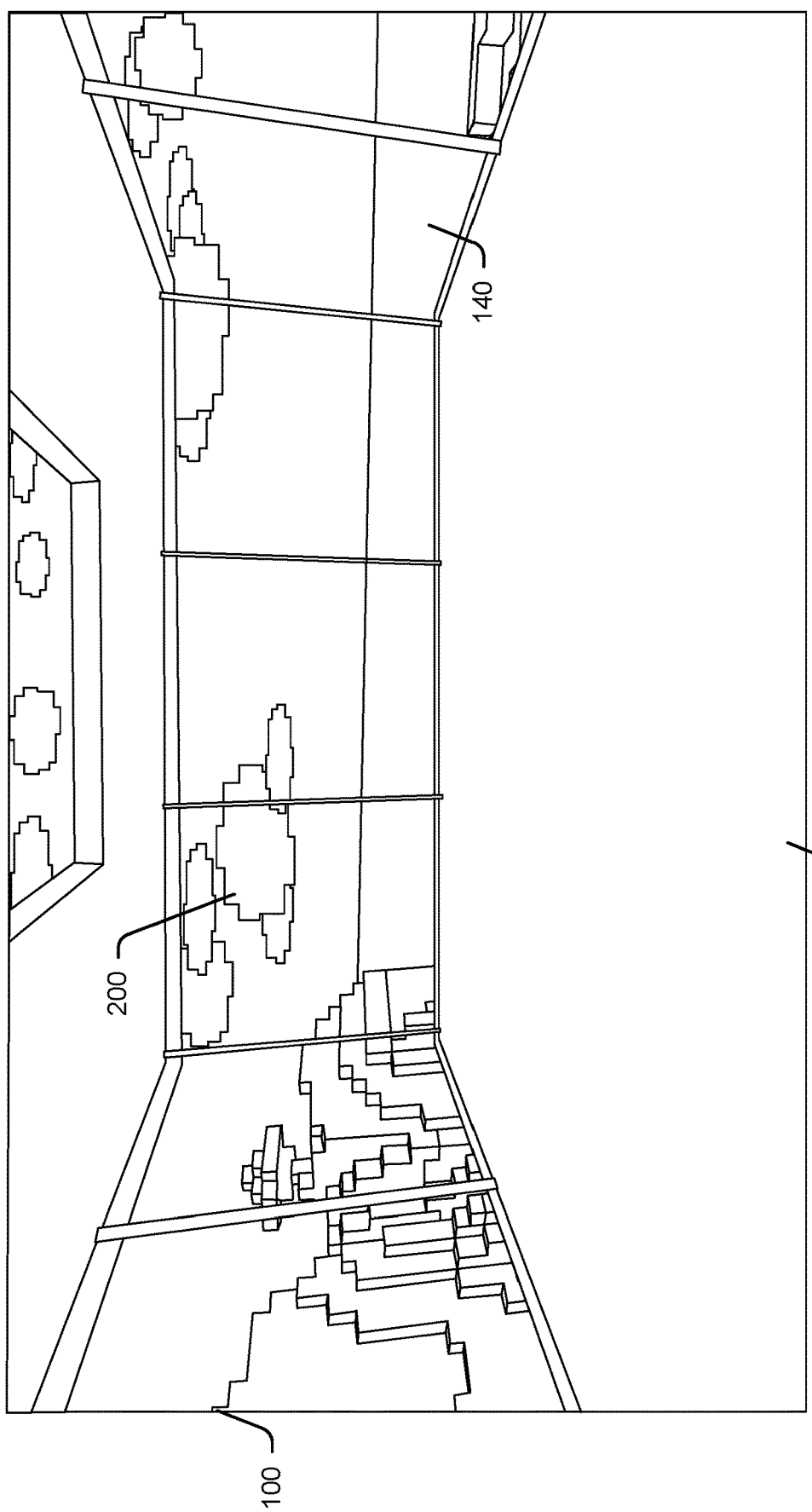
FIG. 2 is a diagram illustrating an example of a screen in a 3D environment according to some embodiments.

Referring to FIG. 2, illustrated is an example of transitioning the 3-D scenes according to some embodiments. In FIG. 2, launch environment 100 is shown after a selection of a video game application was selected via the selection menu 110. In one embodiment, portions of the background 200 are transitioned during a transition time period while the selected video game application is being loaded and launched. In some embodiments, graphics data that is representative of a transition to the destination application or scene may be accessed. For example, a number of graphics files may be stored and accessible via the file system, that represent possible selections of destination applications or scenes. In one embodiment, each application that is installed on the local device may have an associated graphics file that represents a transition scene for the application. If an associated graphics file is not available, a default graphics file may be used. In some embodiments, portions of the background 200 may be transitioned to a destination scene using a progressive scheme such as linear interpolation. In other embodiments, the portions of the background 200 may be transitioned to the destination scene using another progression scheme, such as using the state of the game or application that is to assume control over rendering. For example, a percentage or some other indication of the progress of the destination game or application in being loaded and prepared may be used.

When the destination application is ready to assume rendering of the VR display, then the platform may allow the game or application to assume control of the rendering. In some embodiments, the platform may provide data regarding the user's state such as the user's position and direction of view. Other information may also be provided to enable the game or application to seamlessly assume control of the rendering, based on the user's current state. In many cases the VR system platform and the game or application may be running different 3-D engines, and the platform may provide sufficient information to enable the destination application's 3-D engine to take over the rendering without abrupt transitions or periods of black or blank displays. More generally, the disclosed techniques may be used to facilitate transitions in a VR environment between arbitrary 3D experiences. For example, the disclosed techniques may be used when navigating between web pages and other hyperlinked documents. Additionally, the disclosed techniques may be used to facilitate transitions between scenes within the same application, where avoiding abrupt transitions between scenes should be reduced or avoided.

In an embodiment, during transitions between 3D experiences, an environment such as the environment shown in FIG. 1 may be rendered in the VR display. In the present disclosure, such an environment may be referred to as a "skybox." The application that is to be launched and rendered in the VR environment may be referred to as the destination application. During the transition time when the destination application is being loaded and prepared for launching, visual artifacts that are indicative of the destination application may be rendered in portions of the skybox. In one embodiment, the visual artifacts may be rendered in a graduated manner, either spatially, temporally, or a combination of the two.

In one embodiment, data indicative of a representative splash screen may be provided by the destination application. The representative splash screen may be transitioned onto portions of the launch environment 100. In an embodiment, portions of the representative splash screen may be selected for rendering on the launch environment 100. For example, a random selection of the representative splash screen may be progressively rendered in the launch environment 100. In other embodiments, a portion of the representative splash screen may be rendered in the launch environment 100. A transition time period may be estimated and additional portions of the representative splash screen may be rendered in the launch environment 100 during the transition time period. In some embodiments, the background 140 may be transitioned to render the representative splash screen, for example using linear interpolation or another progressive rendering scheme.

While the transition is rendered, head tracking information for the user may be provided by the platform to the destination application (or the engine that is rendering the destination application). Other information may be provided to the destination application as needed. The destination application may provide the location of an executable file for launching the destination application, splash screen data for rendering on the skybox, and other information for the launch environment 100. In some embodiments, an application programming interface (API) may be used to receive requests for information and to provide the requested information. Additionally or optionally, a repository such as an virtual store may be used to provide information regarding the user status, system status, and other pertinent information.

Figure 3:
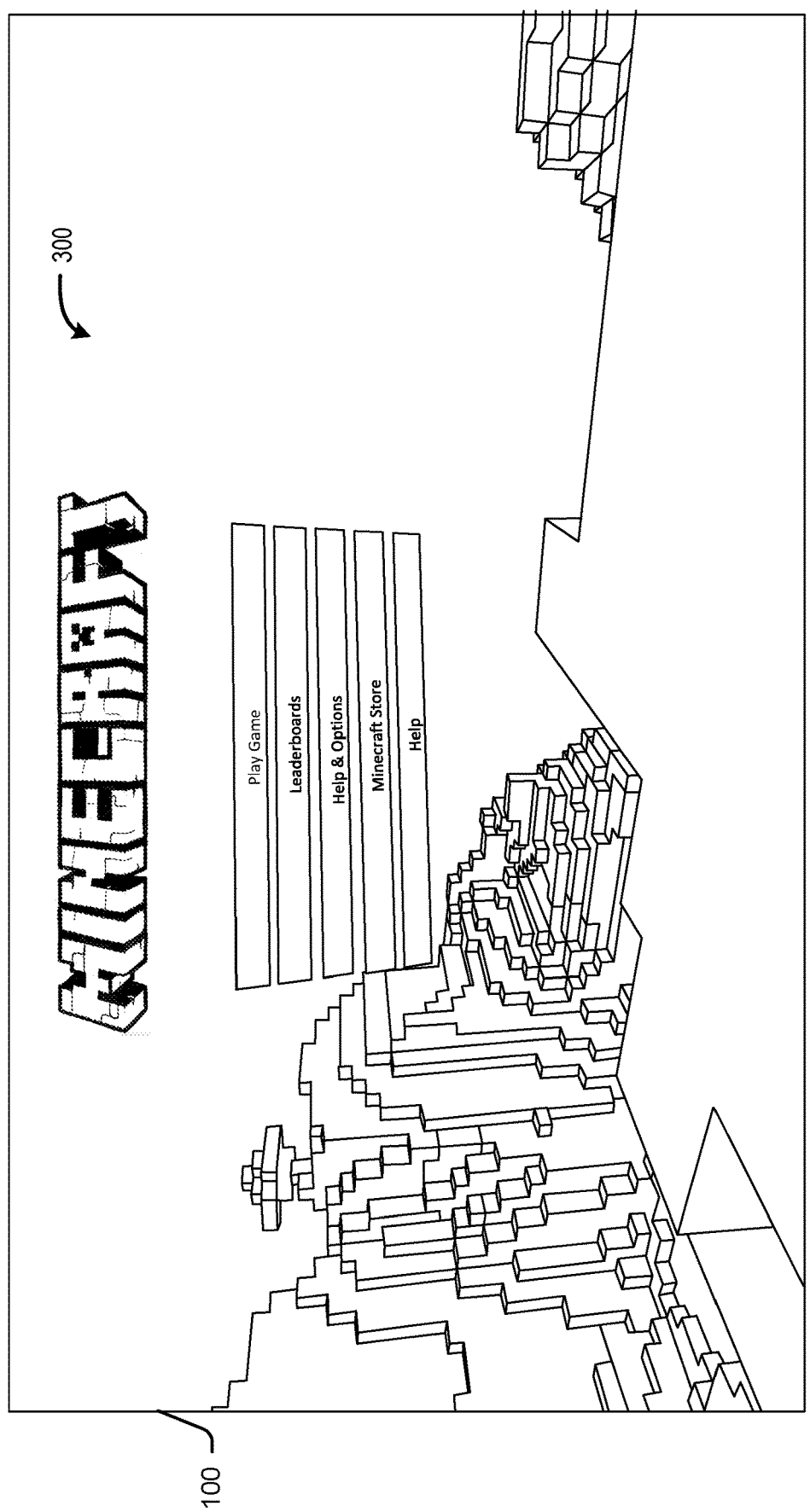
FIG. 3 is a diagram illustrating an example of a screen in a 3D environment according to some embodiments.

Referring to FIG. 3, illustrated is an example screen 300 illustrating the initial screen of the selected video game application after having been loaded and rendering control has been transferred to the video game application. The transition to the screen 300 may be implemented in a seamless fashion as artifacts 200 were being rendered in the transition environment 100 in FIG. 2, maintaining a stable visual environment during the transition while rendering graduated changes to indicate that a transition is taking place. Furthermore, artifacts 200 may be at least visually indicative of the selected video game application, which provides indication to the user that the application being launched is the correct one.

Figure 4:
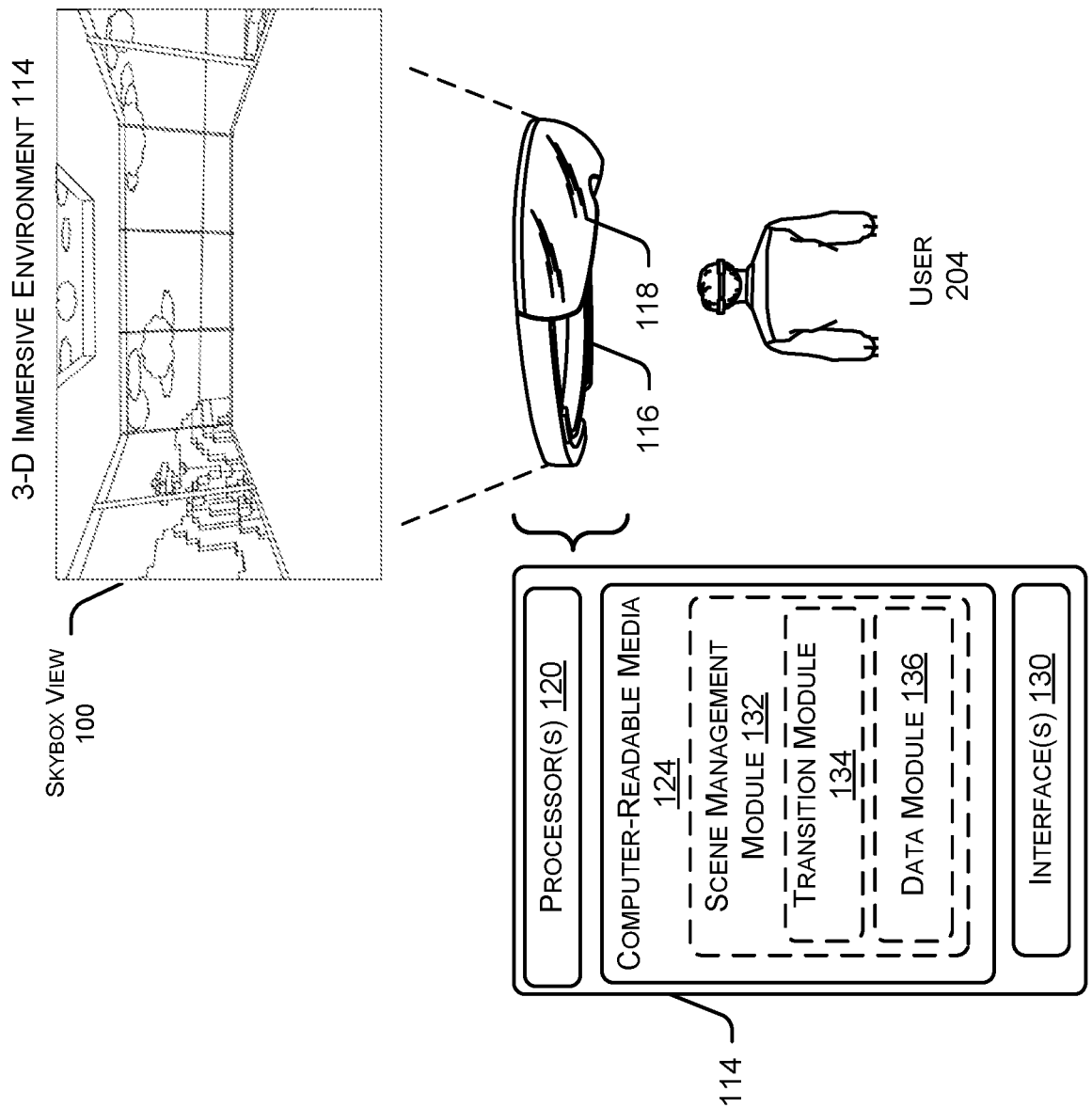
FIG. 4 is a diagram illustrating an example system in which the disclosed techniques may be implemented.

FIG. 4 illustrates a user 204 interacting with a Head Mounted Device (HMD) 116, according to one embodiment. In the figure, user 204 is depicted as wearing HMD 116, which may include a computing device 114 and display 118 that is configured to render images near the eyes of the user.

In one embodiment, computing device 114 may execute an application may be displayed on the HMD 116. Computing device 114 may thus interact with HMD 116 to display images for an application. The processing of operations may be done on the computing device 114, on the HMD 102, or in both computing device 106 and HMD 116.

In the embodiment of FIG. 1, HMD 116 may communicate wirelessly (e.g., WiFi, Bluetooth, etc.) with other devices. In other embodiments (not shown), HMD 16 may be wired via a network (e.g., the Internet). For example, HMD 116 may communicate with a server on a network that provides data or other services. In some embodiments, the HMD 116 may be an autonomous device and the application may be executed directly on the HMD, without the need of an external device to run the application.

In one embodiment, a camera (or cameras) may be coupled to HMD 116. The camera may be a networked camera that sends images to the computing device. Camera 104 may be one or more of a regular image camera, a stereo camera (i.e., with two or more lenses that capture images from the playing area), an infrared camera, a depth camera, a 3D camera, etc.

Images taken with the camera may be processed to track the location and movement of HMD 116. In addition, the images may also be used to track the location and motion of the user or a feature of the user (e.g., head of the user, mouth of the user, hands of the user, torso of the user, etc.), of a controller, or of any other element in the play area.

In one embodiment, the user may provide commands via voice recognition, which may be performed by computing device 114 via sound capture through one or more microphones, or may be performed by HMD 116 which also includes, in one embodiment, one or more microphones. In another embodiment, user 204 may also enter inputs via gestures that are analyzed and recognized by computing device 114.

It is noted that the embodiments illustrated in FIG. 4 are provided as examples. Other embodiments may utilize different devices, a different number of devices, have more or less interaction between the different devices, use other ways of communication. The embodiments illustrated in FIG. 4 should therefore not be interpreted to be exclusive or limiting, but rather illustrative.

The computing device 112 and the head-mounted display device 116 may include processor 120, examples of which are further described herein. Moreover, computing device 112 and the head-mounted display device 116 may include respective computer-readable media 124, as well as communication interface 130, examples of which are further described herein. The computing device 112 and the head-mounted display device 116 coordinate and communicate with one another to execute a scene management module 132. The scene management module 132 provides the functionality to seamlessly switch between scenes so the user 102 can view the three-dimensional scene in a three-dimensional immersive environment via display 118 of the head-mounted display device 116.

Examples of a head-mounted display device 116 include, but are not limited to: OCCULUS RIFT, GOOGLE DAYDREAM VIEW, MICROSOFT HOLOLENS, HTC VIVE, SONY PLAYSTATION VR, SAMSUNG GEAR VR, GOOGLE CARDBOARD, SAMSUNG HMD ODYSSEY, DELL VISOR, HP HEADSET, LENOVO EXPLORER, ACER HEADSET, ASUS WINDOWS MIXED REALITY HEADSET, or any augmented reality, mixed reality, and/or virtual reality devices.

Accordingly, in some instances, the head-mounted display device 116 may not include a processor or computer-readable media. Rather, the head-mounted display device 116 may comprise an output device configured to render data stored on the computing device 112 for display. For instance, the head-mounted display device 116 may be tethered to the computing device 112. Therefore, the interfaces 130 of the computing device 112 and the head-mounted display device 116 can be configured to communicate via a wired and/or wireless Universal Serial Bus ("USB") connection, a BLUETOOTH connection, a High-Definition Multimedia Interface ("HDMI") connection, and so forth.

While managing scenes, the scene management module 132 may provide controls to select and launch applications, or select various controls within an application based on user input. As used herein, a "control" can comprise a displayed graphical user interface (GUI) element (e.g., a button, an object, etc.) that is activated based on an interaction between the GUI element and user input (e.g., a user selects or clicks on the GUI element). A control can alternatively be configured to accept and/or detect other forms of input such as a voice command or a gesture. Thus, a control may be configured to receive user input but may not necessarily be displayed as a GUI element.

Computer-readable media 124 may also include a transition module 134 configured to facilitate scene transitions as further described herein, and data module 136 configured to access and send data to launching applications such as user status.

The computing device 114 may be configured to manage and implement scene changes, as part of a 3D experience and can include, for example, a game console, a desktop computer, a laptop computer, a gaming device, a tablet computer, a mobile phone, a network-enabled television, an Internet of Things (IoT) device, a media player, or other computing device. In some implementations, the computing device includes input/output (I/O) interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display screen, a touch screen, a printer, audio speakers, a haptic output device, and the like).

The computing device 114 may further be configured to communicate via a network such as the Internet, a private network such as an intranet, or some combination of private and public networks. The network can include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. The network can utilize communications protocols, including packet-based and/or datagram-based protocols such as internet protocol (IP), transmission control protocol (TCP), user datagram protocol (UDP), or other types of protocols. The network can also include a number of devices that facilitate network communications such as switches, routers, gateways, access points, firewalls, base stations, repeaters, and the like.

In various implementations, the interfaces of a computing device and a head-mounted display device can be configured to operate in accordance with, and communicate over, a personal area network (PAN) that uses a wired and/or a wireless connection. For example, a PAN connection can operate in accordance with Infrared Data Association ("IrDA"), BLUETOOTH, wired and/or wireless Universal Serial Bus ("USB"), Z-Wave, ZIGBEE, or other short-range wireless technology.

As used herein, a "processor" can represent, for example, a CPU-type processing unit, a GPU-type processing unit including a virtual GPU (VGPU), a field-programmable gate array (FPGA), a digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, "computer-readable media" can store instructions executable by a processor and/or data (e.g., model data for a scene, a template, or an object). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of memory included in a device and/or a hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The modules illustrated in FIG. 4 are is just examples, and the number of modules used to implement the scene transition platform can vary higher or lower. That is, functionality described herein in association with the illustrated modules can be performed by a fewer number of modules or a larger number of modules on one device or spread across multiple devices.

Figure 5:
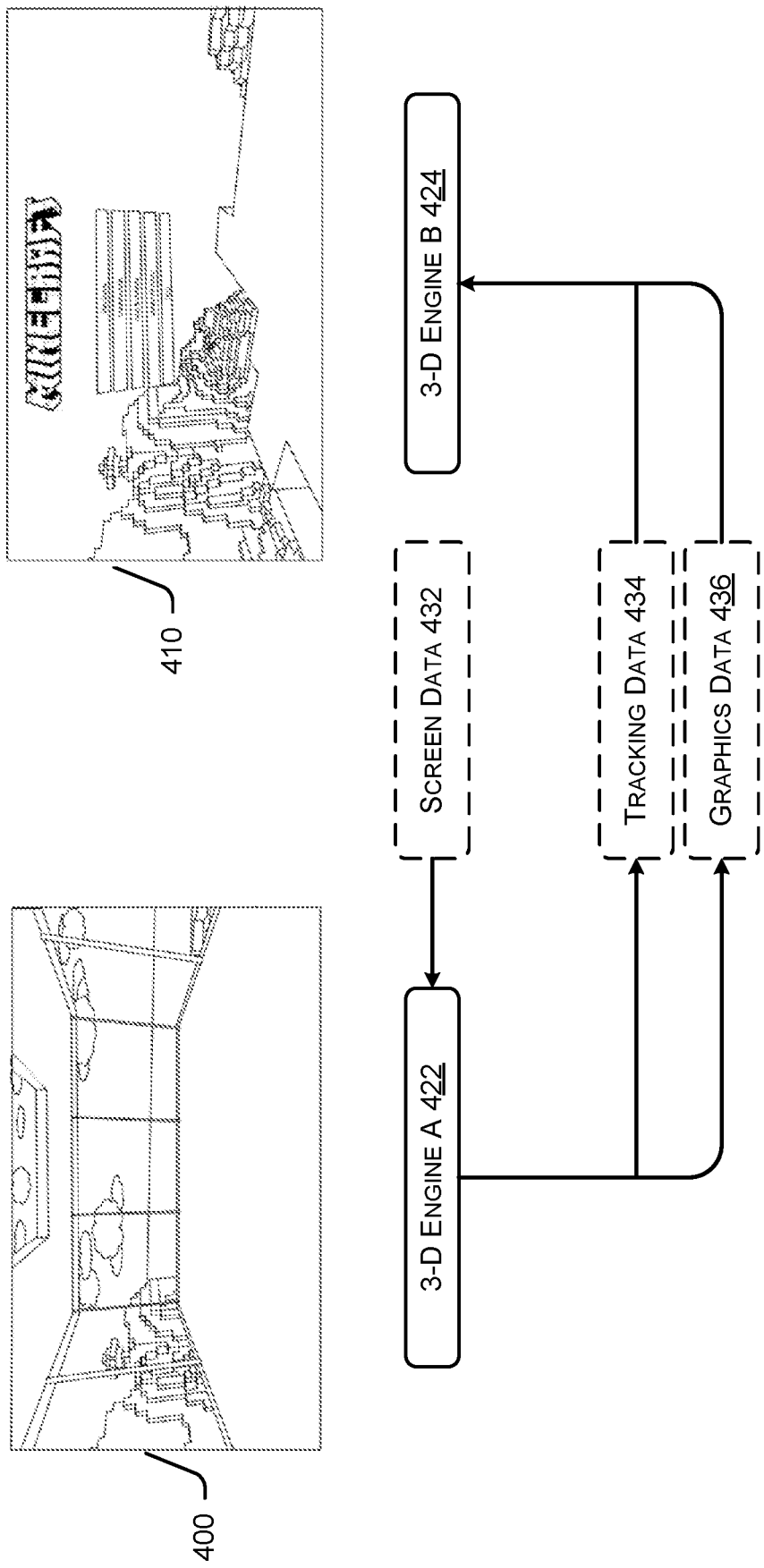
FIG. 5 is a diagram that illustrates an example of data communications according to the techniques described herein.

Referring to FIG. 5, illustrated is an example of processes and data flows to effectuate scene management techniques as disclosed herein. Skybox 400 may be rendered by a first 3-D engine 422. In some embodiments, the first 3-D engine 422 may be provided by the host system. Also illustrated in FIG. 5 is the screen rendered in conjunction with the destination application 410, which may be rendered by a second 3-D engine 424. In some embodiments, the second 3-D engine 424 may be provided by the destination application 410. When the destination application 410 is selected to be launched, screen data 432 may be accessed by the first 3-D engine 422. The screen data 432 may be stored locally and accessible via a file system, stored remotely and accessible via a network, provided by the second 3-D engine 424, or otherwise made available to the first 3-D engine 422. The screen data 432 may include, for example, splash screen data for the selected destination application 410. The first 3-D engine 422 may use the screen data 432 to render artifacts on the skybox 400 during a time period for the scene transition.

The first 3-D engine 422 may provide tracking data 434 to the second 3-D engine 424 to allow for the destination application 410 to begin rendering based on the user's state. The tracking data 434 may include the user's current viewing position and the position and orientation of the VR device. For example, the tracking data 434 may comprise the six degrees of freedom of a user's head when wearing a VR device, such as X, Y, Z coordinates and pitch, roll, and yaw.

The first 3-D engine 422 may also provide graphics data 434 to the second 3-D engine 424 to allow for the destination application 410 to begin rendering based on the current view of the skybox 400 and artifacts that have been rendered. Graphics data 436 may be used by the second 3-D engine 424 to include, if desired, any portions of the skybox 400 and associated artifacts that the second 3-D engine 424 may include when the second 3-D engine 424 assumes control of the rendering tasks.

Figure 6:
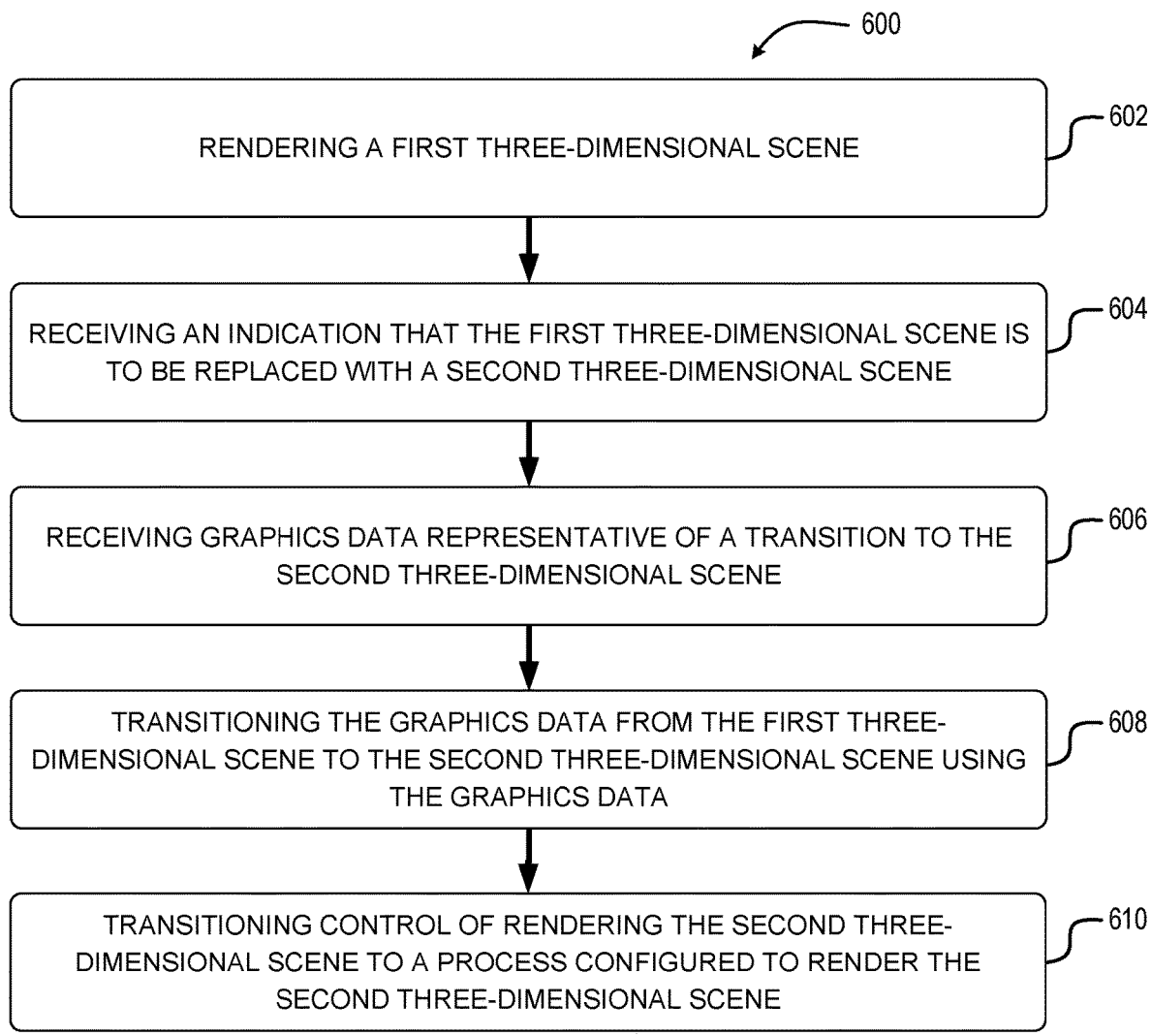
FIG. 6 is a diagram of an example flowchart that illustrates operations directed to scene management.
Figure 7:
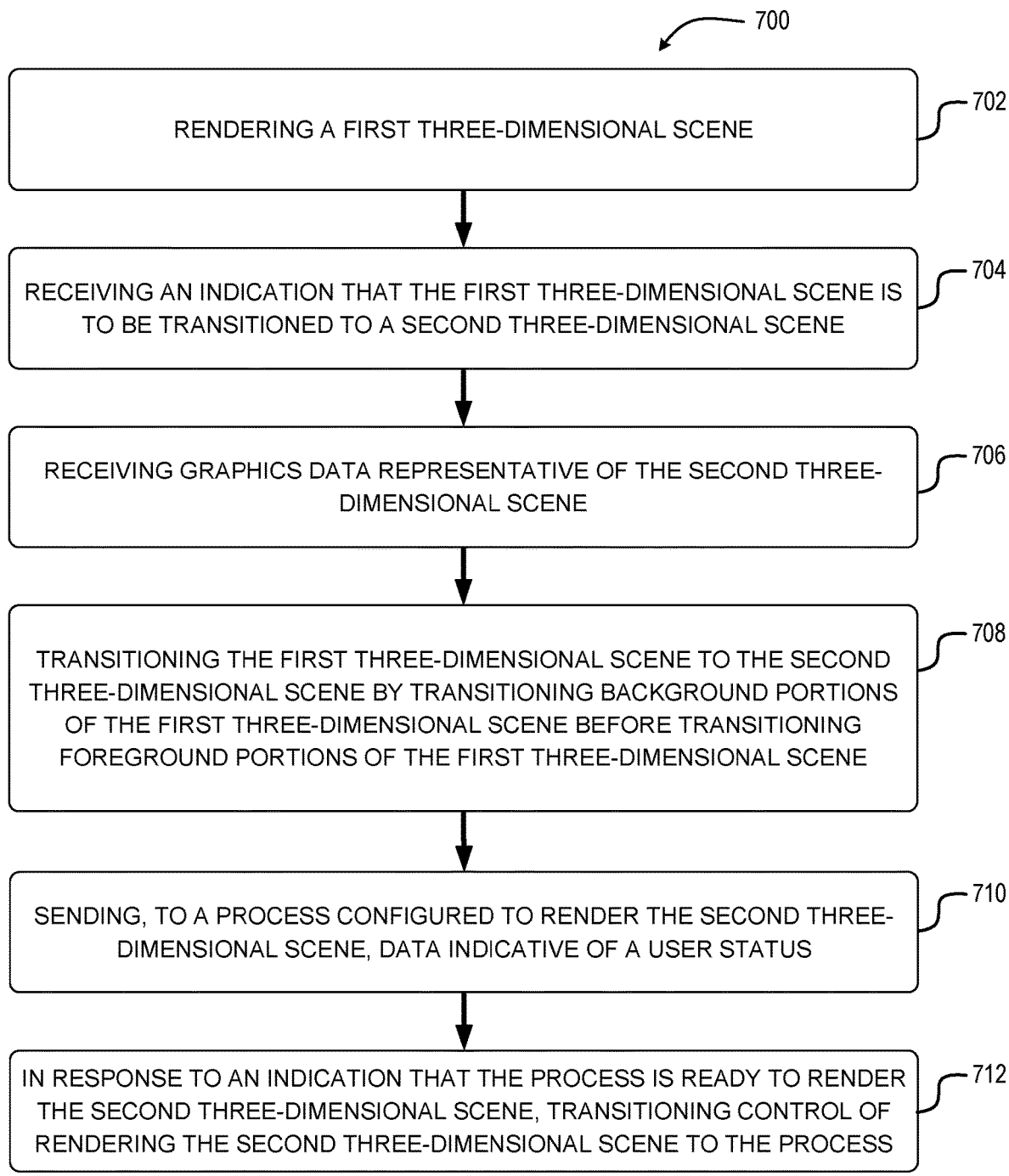
FIG. 7 is a diagram of an example flowchart that illustrates operations directed to scene management.
Figure 8:
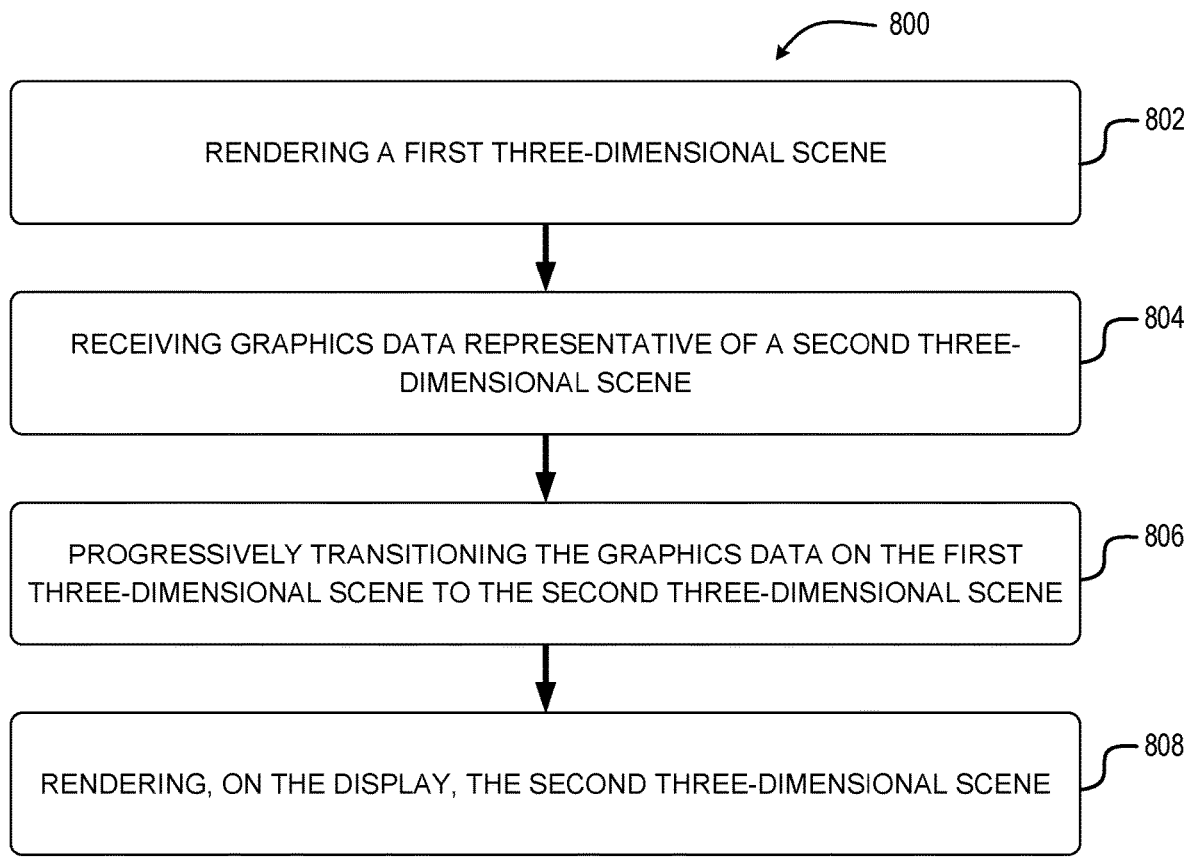
FIG. 8 is a diagram of an example flowchart that illustrates operations directed to scene management.

FIGS. 6, 7, and 8 depict flowcharts of methods. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, wearable computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Additionally, the operations described herein can be implemented as a sequence of computer implemented acts or program modules running on a computing system (e.g., computing device 112, a head-mounted display device 116, and/or devices of a network provider).

FIG. 6 is a diagram of an example flowchart 600 that illustrates operations directed to managing scene transitions in a three-dimensional environment in accordance with the present disclosure. The operations in FIG. 6 can be performed, for example, by the computing device 112, the head-mounted computing device 116, and/or a device of a network provider, as described above with respect to any one of FIGS. 1-5.

At operation 602, a first three-dimensional scene is rendered.

At operation 604, an indication that the first three-dimensional scene is to be replaced with a second three-dimensional scene is received.

At operation 606, graphics data representative of a transition to the second three-dimensional scene is received. In some embodiments, the graphics data may include one or more graphics files that are representative of destination application. The graphics data may include a stored set of data for each application. In some embodiments, the graphics data may be updated by the various applications as needed.

At operation 608, the first three-dimensional scene is transitioned to the second three-dimensional scene using the graphics data.

In some embodiments, linear interpolation may be used to progressively transition the first three-dimensional scene based on the graphics data. Linear interpolation may include rendering intermediate pixels based on an interpolation between the first and second three-dimensional scenes. In one embodiment, interpolation may be used to determine intermediate values in between the first and second scenes. For example, intermediate frames between the first and second scenes may be generated using one or more interpolation algorithms. The algorithms may approximate dynamics or spatial averages between the first and second scenes. In some embodiments, the step value between values of the first and second scenes may be determined based on a state such as the degree of completion or preparedness of the process that is to assume control of rendering the second scene as well as subsequent scenes. As used herein, the process that is to assume control of rendering the second scene may be referred to as the destination process. For example, if the destination process has completed 25% of tasks to prepare for assuming control of rendering, then a 25% step value (or a proportional value) may be used for the interpolation.

At operation 610, control of rendering the second three-dimensional scene is transitioned to a process configured to render the second three-dimensional scene. In some embodiments, the rendering may be transitioned when the destination process indicates that it is ready to assume control. In some embodiments, control is transitioned subsequent to rendering the graphics data on the first three-dimensional scene. Additionally, the second three-dimensional scene may be rendered based at least in part on the user status. In an embodiment, the transitioning is performed without rendering a black or blank three-dimensional scene.

In some embodiments, data indicative of a user status may be sent to the process configured to render the second three-dimensional scene. The second three-dimensional scene is rendered based at least in part on the user status. In an embodiment, the data indicative of the user status comprises data three-dimensional position and orientation of the user, such as coordinates in a three-dimensional coordinate system, and orientation such as pitch, roll, and yaw.

In an embodiment, the first three-dimensional scene comprises a foreground element and a background element, and the transitioning comprises updating portions of the background element of the first three-dimensional scene with the graphics data. Additionally, the transitioning further comprises fading away the foreground prior to transitioning the control, wherein the process fades in a new foreground.

In some embodiments, the transitioning comprises updating portions of the first three-dimensional scene based on a linear interpolation between the first three-dimensional scene and the graphics data. In one embodiment, the transitioning comprises proportionally updating portions of the first three-dimensional scene based on the graphics data and an indication of an amount of completion of loading of a destination application.

In an embodiment, data indicative of the first three-dimensional scene may be sent to the process configured to render the second three-dimensional scene. The process configured to render the second three-dimensional scene may be configured to render portions of the first three-dimensional scene when the control is transitioned.

In some embodiments, a portal that includes a representative rendering of the second three-dimensional scene is rendered on the first three-dimensional scene.

In some embodiments, the first three-dimensional scene and second three-dimensional scene are different scenes associated with an application.

The first three-dimensional scene may be rendered by a first 3-D engine and the second three-dimensional scene may be rendered by a second 3-D engine.

FIG. 7 is a diagram of an example flowchart 700 that illustrates operations directed to managing scenes in a three-dimensional environment. In some embodiments, operations in FIG. 7 can be performed by the computing device 112, the head-mounted computing device 116, and/or a device of a network provider, as described above with respect to any one of FIGS. 1-5.

At operation 702, a first three-dimensional scene is rendered on a display device configured to render a three-dimensional environment.

At operation 704, an indication that the first three-dimensional scene is to be transitioned to a second three-dimensional scene is received.

At operation 706, graphics data representative of the second three-dimensional scene is received.

At operation 708, the first three-dimensional scene is transitioned to the second three-dimensional scene by transitioning background portions of the first three-dimensional scene before transitioning foreground portions of the first three-dimensional scene.

At operation 710, data indicative of a user status is sent to a process configured to render the second three-dimensional scene.

At operation 712, in response to an indication that the process is ready to render the second three-dimensional scene, control of rendering the second three-dimensional scene is transitioned to the process.

In some embodiments, the first three-dimensional scene is a launch screen configured to receive a user input indicative of a selection for launching a destination application. Additionally, the first three-dimensional scene may be associated with a first application and the second three-dimensional scene may be associated with a second application.

FIG. 8 is a diagram of an example flowchart 800 that illustrates operations directed to managing scenes in a three-dimensional environment. The operations in FIG. 8 can be performed by the computing device 112, the head-mounted computing device 116, and/or a device of a network provider, as described above with respect to any one of FIGS. 1-5.

At operation 802, a first three-dimensional scene is rendered on the display.

At operation 804, graphics data representative of a second three-dimensional scene is received.

At operation 806, the first three-dimensional scene is progressively transitioned to the second three-dimensional scene using the graphics data.

At operation 808, the second three-dimensional scene is rendered on the display. In an embodiment, the second three-dimensional scene may be rendered based at least in part on tracking data for a user of the device. In an embodiment, the second three-dimensional scene may be rendered subsequent to the selective rendering.

In some embodiments, the second three-dimensional scene may be rendered by a different process than the first three-dimensional scene. Additionally, control of rendering on the display may be transitioned to the process rendering the second three-dimensional scene.

In one embodiment, the graphics data may be received from the process rendering the second three-dimensional scene.

In an embodiment, progressively transitioning comprises transitioning background portions of the first three-dimensional scene using linear interpolation.

In an embodiment, the second three-dimensional scene is a start screen for the destination application.

The disclosure presented herein may be considered in view of the following example clauses.

Example Clause A, a device comprising:
one or more displays configured to render a three-dimensional environment;
at least one processor; and
memory storing instructions that, when executed by the at least one processor, cause the device to perform operations comprising:
rendering, on the displays, a first three-dimensional scene;
receiving an indication that the first three-dimensional scene is to be replaced with a second three-dimensional scene;
receiving graphics data representative of a transition to the second three-dimensional scene;
transitioning from the first three-dimensional scene to the second three-dimensional scene using the graphics data;
and
transitioning control of rendering the second three-dimensional scene to a process configured to render the second three-dimensional scene.

Example Clause B, the device of Example Clause A, further comprising instructions that, when executed by the at least one processor, cause the device to perform operations comprising sending, to the process configured to render the second three-dimensional scene, data indicative of a user status.

Example Clause C, the device of Example Clause B, wherein the first three-dimensional scene comprises a foreground element and a background element, and the transitioning comprises updating portions of the background element of the first three-dimensional scene with the graphics data.

Example Clause D, the device of any one of Example Clauses A through C, wherein the transitioning further comprises fading away the foreground prior to transitioning the control, wherein the process fades in a new foreground.

Example Clause E, the device of any one of Example Clauses A through D, wherein the transitioning comprises updating portions of the first three-dimensional scene based on a linear interpolation between the first three-dimensional scene and the graphics data.

Example Clause F, the device of any one of Example Clauses A through D, wherein the transitioning comprises proportionally updating portions of the first three-dimensional scene based on the graphics data and an indication of an amount of completion of loading of a destination application.

Example Clause G, the device of any one of Example Clauses A through F, wherein the data indicative of the user status comprises data three-dimensional position and orientation of the user.

Example Clause H, the device of any one of Example Clauses A through G, wherein the transitioning is performed without rendering a black or blank three-dimensional scene.

Example Clause I, the device of any one of Example Clauses A through G, further comprising sending, to the process configured to render the second three-dimensional scene, data indicative of the first three-dimensional screen, wherein the process configured to render the second three-dimensional scene is further configured to render portions of the first three-dimensional screen when the control is transitioned.

Example Clause J, the device of any one of Example Clauses A through I, further comprising rendering, on the first three-dimensional scene, a portal that includes a representative rendering of the second three-dimensional scene.

Example Clause K, the device of any one of Example Clauses A through J, wherein the first three-dimensional scene and second three-dimensional scene are different scenes associated with an application.

Example Clause L, the device of any one of Example Clauses A through K, wherein the first three-dimensional scene is rendered by a first 3-D engine and the second three-dimensional scene is rendered by a second 3-D engine.

While Example Clauses A through L are described above with respect to a device, it is understood in the context of this disclosure that the subject matter of Example Clauses A through L can additionally or alternatively be implemented as a method or via computer readable storage media.

Example Clause M, a method comprising:
rendering, on a display device configured to render a three-dimensional environment, a first three-dimensional scene;
receiving an indication that the first three-dimensional scene is to be transitioned to a second three-dimensional scene;
receiving graphics data representative of the second three-dimensional scene;
transitioning the first three-dimensional scene to the second three-dimensional scene by transitioning background portions of the first three-dimensional scene before transitioning foreground portions of the first three-dimensional scene;
sending, to a process configured to render the second three-dimensional scene, data indicative of a user status; and
in response to an indication that the process is ready to render the second three-dimensional scene, transitioning control of rendering the second three-dimensional scene to the process.

Example Clause N, the method of Example Clause M, wherein the first three-dimensional scene is a launch screen configured to receive a user input indicative of a selection for launching a destination application.

Example Clause O, the method of Example Clause M or Example Clause N, wherein the first three-dimensional scene is associated with a first application and the second three-dimensional scene is associated with a second application.

While Example Clauses M through O are described above with respect to a method, it is understood in the context of this disclosure that the subject matter of Example Clauses M through O can additionally or alternatively be implemented by a device or via computer readable storage media.

Example Clause P, a device comprising: an interface configured to control a display configured to render a three-dimensional environment;
at least one processor; and
memory storing instructions that, when executed by the at least one processor, cause the device to perform operations comprising:
rendering, on the display, a first three-dimensional scene;
receiving graphics data representative of a second three-dimensional scene;

progressively transitioning the first three-dimensional scene to the second three-dimensional scene using the graphics data; and rendering, on the display, the second three-dimensional scene, wherein the second three-dimensional scene is rendered based at least in part on tracking data for a user of the device.

Example Clause Q, the device of Example Clause P, wherein the second three-dimensional scene is rendered by a different process than the first three-dimensional scene, further comprising transitioning control of rendering on the display to the process rendering the second three-dimensional scene.

Example Clause R, the device of Example Clause P or Example Clause Q, wherein the graphics data is received from the process rendering the second three-dimensional scene.

Example Clause S, the device of any one of Example Clauses P through Q, wherein the progressively transitioning comprises transitioning background portions of the first three-dimensional scene using linear interpolation.

Example Clause T, the device of any one of Example Clauses P through S, wherein the second three-dimensional scene is a start screen for the destination application.

While Example Clauses P through T are described above with respect to a device, it is understood in the context of this disclosure that the subject matter of Example Clauses P through T can additionally or alternatively be implemented as a method or via computer readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A device comprising:
one or more displays configured to render a three-dimensional environment;
at least one processor; and
memory storing instructions that, when executed by the at least one processor, cause the device to perform operations comprising:
rendering, on the displays, a first three-dimensional scene, wherein the first three-dimensional scene comprises a foreground element and a background element;
receiving an indication that the first three-dimensional scene is to be replaced with a second three-dimensional scene;
receiving graphics data representative of a transition to the second three-dimensional scene;
transitioning from the first three-dimensional scene to the second three-dimensional scene by updating portions of the background element of the first three-dimensional scene with the graphics data;
and
transitioning control of rendering the second three-dimensional scene to a process configured to render the second three-dimensional scene.

2. The device of claim 1, further comprising instructions that, when executed by the at least one processor, cause the device to perform operations comprising sending, to the process configured to render the second three-dimensional scene, data indicative of a user status, wherein the second three-dimensional scene is rendered based on the user status.

3. The device of claim 1, wherein the transitioning further comprises fading away the foreground prior to transitioning the control, wherein the process fades in a new foreground.

4. The device of claim 1, wherein the transitioning comprises updating portions of the first three-dimensional scene based on a linear interpolation between the first three-dimensional scene and the graphics data.

5. The device of claim 1, wherein the transitioning comprises proportionally updating portions of the first three-dimensional scene based on the graphics data and an indication of an amount of completion of loading of a destination application.

6. The device of claim 2, wherein the data indicative of the user status comprises data three-dimensional position and orientation of the user.

7. The device of claim 1, wherein the transitioning is performed without rendering a black or blank three-dimensional scene.

8. The device of claim 1, further comprising sending, to the process configured to render the second three-dimensional scene, data indicative of the first three-dimensional scene, wherein the process configured to render the second three-dimensional scene is further configured to render portions of the first three-dimensional scene when the control is transitioned.

9. The device of claim 1, further comprising rendering, on the first three-dimensional scene, a portal that includes a representative rendering of the second three-dimensional scene.

10. The device of claim 1, wherein the first three-dimensional scene and second three-dimensional scene are different scenes associated with an application.

11. The device of claim 1, wherein the first three-dimensional scene is rendered by a first 3-D engine and the second three-dimensional scene is rendered by a second 3-D engine.

12. A method comprising:
rendering, on a display device configured to render a three-dimensional environment, a first three-dimensional scene comprising a foreground element and a background element;
receiving an indication that the first three-dimensional scene is to be transitioned to a second three-dimensional scene;
receiving graphics data representative of the second three-dimensional scene;
transitioning the first three-dimensional scene to the second three-dimensional scene by updating portions of the background element of the first three-dimensional scene with the graphics data;
sending, to a process configured to render the second three-dimensional scene, data indicative of a user status; and
in response to an indication that the process is ready to render the second three-dimensional scene, transitioning control of rendering the second three-dimensional scene to the process.

13. The method of claim 12, wherein the first three-dimensional scene is a launch screen configured to receive a user input indicative of a selection for launching a destination application.

14. The method of claim 12, wherein the first three-dimensional scene is associated with a first application and the second three-dimensional scene is associated with a second application.

15. A device comprising:
an interface configured to control a display configured to render a three-dimensional environment;
at least one processor; and
memory storing instructions that, when executed by the at least one processor, cause the device to perform operations comprising:
rendering, on the display, a first three-dimensional scene comprising a foreground element and a background element;
receiving graphics data representative of a second three-dimensional scene;
transitioning the first three-dimensional scene to the second three-dimensional scene by updating portions of the background element of the first three-dimensional scene with the graphics data; and
rendering, on the display, the second three-dimensional scene, wherein the second three-dimensional scene is rendered based on tracking data for a user of the device.

16. The device of claim 15, wherein the second three-dimensional scene is rendered by a different process than the first three-dimensional scene, further comprising transitioning control of rendering on the display to the process rendering the second three-dimensional scene.

17. The device of claim 16, wherein the graphics data is received from the process rendering the second three-dimensional scene.

18. The device of claim 16, wherein the transitioning comprises transitioning background portions of the first three-dimensional scene using linear interpolation.

19. The device of claim 16, wherein the second three-dimensional scene is a start screen for a destination application.

* * * * *